United States Patent

[11] 3,586,808

[72] Inventors Akira Shibata;
 Shigeru Tabei, both of Tokyo, Japan
[21] Appl. No. 815,547
[22] Filed Apr. 14, 1969
[45] Patented June 22, 1971
[73] Assignee Chugai Electric Industrial Co., Ltd.
 Tokyo, Japan

[54] BUTTON TYPE COMPOSITE CONTACT
 5 Claims, 5 Drawing Figs.
[52] U.S. Cl. ............................................. 200/166,
 29/630
[51] Int. Cl. ............................................... H01h 1/02
[50] Field of Search ............................................ 200/166 C;
 29/630

[56] References Cited
 UNITED STATES PATENTS
2,414,463 1/1947 Gunn et al. .................. 200/166 (C)
2,425,053 8/1947 Swinehart ...................200/166 (C) (X)
2,468,888 5/1949 Mekelburg ................... 200/166 (C)
2,706,759 4/1955 Williamson .................. 200/166 (C)
2,925,647 2/1960 Jones et al. ..................200/166 (C) (X)
3,177,329 4/1965 Freudiger et al. ............. 200/166 (C)
3,191,275 6/1965 Gwyn, Jr. ....................200/166 (C) (X)
3,226,517 12/1965 Schreiner ..................... 200/166 (C)
3,339,048 8/1967 Haderer ....................... 200/166 (C)

*Primary Examiner*—H. O. Jones
*Attorney*—Sandoe, Hopgood & Calimafde

ABSTRACT: A button-type composite contact having a contact surface element of precious metal bonded to a composite base metal backup element. The composite backup element is formed of a first base metal portion in integral relation with a second base metal portion. An end face of the integral first and second base metal portions is intimately pressure bonded to the precious metal contact element via one of said base metals which is pressure bondable to the precious metal. The other of said base metals is spot weldable at the free end of said composite backup element, such that the button-type contact element can be spot welded via the free end of said backup element to another metallic element.

PATENTED JUN22 1971      3,586,808

INVENTORS
AKIRA SHIBATA and
SHIGERU TABEI

BY Sandoe, Hopgood & Calimafde
ATTORNEY

BUTTON TYPE COMPOSITE CONTACT

The present invention relates to a button type composite contact, more particularly, a button type composite contact comprising a precious metal portion serving as a contact surface and a base metal back portion pressure bonded to said precious metal portion.

The button conventional type composite contact of the type, is produced in such way that a piece of precious metal, for example, gold, silver or gold-silver alloy, and a piece of base metal, for example, copper or phosphor bronze are placed one upon another with neat surfaces mated to each other, and welded and molded into a composite contact having a part of base metal back portion thereof projected outwardly. Then, the composite contact is spot welded at said outwardly projected base metal back portion to another metallic element. Accordingly, such base metallic material is desirable, as an element of a composite contact, to have an excellent property or adaptability for pressure bonding in warm or cold working to precious metallic material, and in respect of use, to have adaptability for spot welding. However, difficulty is found to obtain such base metallic material having an excellent property of pressure bonding to precious metallic material as well as excellent spot weldability. For example, copper has a property adaptable for pressure bonding but not for spot welding, and phosphor bronze has an excellent spot weldability but a poor pressure welding property.

In view of the disadvantage of base metal as set hereinabove, a primary object of the present invention is to provide a button type composite contact comprising a contact surface element and a base element, which are pressure bonded rigidly to each other as a solid body, said base element including a weldable portion having an excellent spot weldability and an outwardly projected or exposed end surface.

In the accompanying drawings.

Description will be made with reference to the accompanying drawings.

Figure 1:
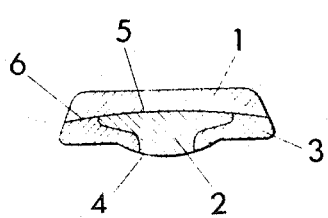
FIGS. 1 and 2 are sectional views each showing an embodiment of a composite contact according to the present invention.
Figure 4:
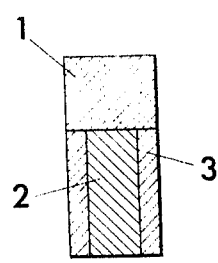
FIGS. 4 and 5 are sectional views each showing a combination arrangement of base metal and precious metal, prior to subjecting pressure bonding, of composite contacts in FIGS. 1 and 2.

In FIG. 1, numeral 1 is a precious metal portion consisting of a strip of gold, silver or gold-silver alloy and serving as a contact surface; and numerals 2 and 3 are base metal portions pressure bonded in cold or warm working to said precious metal portion 1 and serving as a base or back element. The composite contact in FIG. 1 is produced by a header from a precious metal strip 1 and a composite rod of base metals consisting of base metal strip 2 having an excellent adaptability for electric spot welding and a base metal hollow rod 3 having an excellent property of pressure bonding to the precious metal strip, each of which has a proper length and is in arrangement as shown in FIG. 4. Arrangement of said composite rods of base metal is such that a base metal rod having an excellent property of pressure bonding, for example, copper as described, takes an outer portion 3, and a base metal strip having adaptability for spot welding, for example phosphor bronze, takes an inner or core portion 2. The thus arranged composite metal rods are subject to molding, in a manner of upsetting to form an outwardly projected welding end surface at an under end of inner or core portion 2 consisting of a base metal strip adaptable for spot welding, as indicated with reference numeral 4 in FIG. 1. Base metal portions 2 and 3 are pressure bonded to the precious metal portion 1 at respective bonding surfaces 5 and 6. Attention is directed to the fact that where there is relatively poor bonding between the surface of base metal portion 2 and surface portion 1 due to comparatively poor property of pressure bonding to the surface of precious metal portion 1 serving as a contact surface, this is compensated for by internal integration taking place in the mating surface between the base metal portion 2 and the base metal portion 3 pressure bonded rigidly to the contact surface portion 1 and extending axially thereof. The experiment shows that, in order to obtain such internal integration of the mating surface between both base metal portions, reduction of materials along the longitudinal length should be more than about 20 percent.

Figure 2:
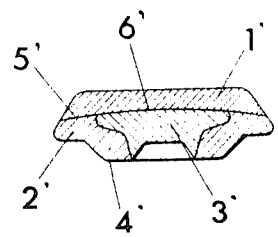
Figure 3:
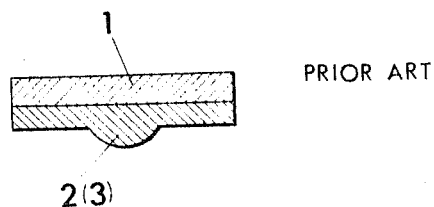
FIG. 3 is a sectional view showing a known composite contact.
Figure 5:
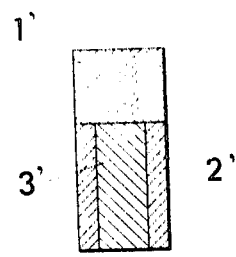

In the example in FIG. 2, arrangement of base metal rods is reversed to that of FIG. 1. That is, a base metal rod having an adaptability for spot welding is located outwardly, and a base metal strip adaptable for pressure bonding is located inwardly or centrally, as shown in FIG. 5. Reference numerals in FIGS. 2 and 5 corresponding to those of FIGS. 1 and 4 are each dot-marked. In the example of FIG. 2 or 5, a base metal portion 2' formed with a base metallic material adaptable for spot welding surrounds the inner or central base metal portion 3' and forms an annular welding end surface 4' at the lower end.

EXAMPLE I

A contract surface element consisting of a short strip of gold with a 1.5 mm. diameter and a 3.2 mm. length and a composite base element consisting of a short hollow rod of copper with a 0.5 mm. thickness into which a short strip of phosphor bronze with a 3 mm. diameter and 3.6 mm. length is insertedly fitted, are placed one upon another with surfaces mated each other in series in a longitudinal direction thereof, and molded by a header in cold working at pressure 1,000 kg., whereby a button type composite contact having a configuration similar to that of FIG. 1 is obtained by upsetting in the longitudinal direction. The contact surface element of the thus produced composite contact has an upper contact surface with a 2.8 mm. diameter and a lower surface with a 2.9 mm. diameter, bonded to the composite base element. The lower bonded surface of gold contact surface element shows the dimensional ratio of about 1 to 8, between the surface 5 in FIG. 1 bonded to the phosphor bronze portion having a comparatively poor pressure bonding property and the surface 6 bonded to the copper portion having an excellent pressure bonding property. The base element portion of said composite contact has the lower surface with a 3 mm. diameter, including a downwardly projected or bulged circular end surface with a 0.8 mm. diameter having an excellent spot weldability. The exfoliation test applied to the bonding or mating surface between the contact surface element and the base element shows that the surface can stand more than 50 kg. The exfoliation test subsequently applied to the spot welded portion of this composite contact spot welded at the downwardly projected circular end portion to brass, shows that it can stand more than 30 kg.

In this connection, in a further example of button type contact consisting of a gold contact surface element and a single base element of phosphor bronze, and having a configuration similar to that in the above example, at the exfoliation test applied to the bonded or mated surface between both elements shows that it can hardly stand less than 3 kg., while the exfoliation test on the spot welded portion shows that it can stand more than 30 kg.

In another example of button type contact consisting of a contact surface element of gold and a single base element of copper, and having a configuration similar to that set forth in the foregoing example, the exfoliation test applied to the bonded or mated surface between both elements shows that it can stand more than 50 kg., and the exfoliation test made on the spot welded portion shows that it can hardly stand less than 5 kg.

EXAMPLE II

A contact surface element consisting of a short strip of silver having a 3 mm. diameter and a composite base element consisting of a short hollow rod of nickel with a 0.2 mm. wall thickness into which a short strip of copper with a 3 mm.

diameter is insertedly fitted, are placed one upon another with surfaces mated to each other in series in a longitudinal direction thereof, and subsequently molded by a header at pressure 3,000 kg. into a button type composite contact similar to that shown in FIG. 2. The contact surface element of the thus produced composite contact has the upper contact surface with a 5.8 mm. diameter and the bonding surface with a 5.9 mm. diameter, bonded to the base elements. The lower bonded surface of the silver contact surface element shows the dimensional ratio of about 1 to 8, between the surface 5' in FIG. 2 bonded to nickel having a comparatively poor property of pressure bonding and the surface 6' bonded to copper having an excellent property of pressure bonding. The composite base element of said composite contact has a 6 mm. lower end surface in diameter, including a 2.5 mm. width of annular end surface of spot weldable nickel exposed outwardly at the lower end of said base element. The exfoliation test applied to the bonding or mating surface between said contact surface element and the base element shows that it can stand more than 90 kg. The exfoliation test on the spot welded portion of this composite contact spot welded to nickel silver, shows that it can stand more than 60 kg. By the way, in a further example of a button shaped contact consisting of a contact surface element of silver and a single base metal element of nickel, and having a similar configuration to that in the former example, the exfoliation test applied to the bonding or mating surface between both elements shows that it can hardly stand less than 5 kg., and the same test applied to the spot welded portion shows that it can stand more than 60 kg. In still another example of a button shaped composite contact consisting of a silver contact surface element and a single base metal element of copper, and having a configuration like to that of the former example, the exfoliation tests applied to the bonding or mating surface between both elements and to the spot welded portion respectively show more than 90 kg., and less than 5 kg.

Summarizing the foregoing, the invention is directed to a button-type composite contact comprising a contact surface element of precious metal bonded to a composite base metal backup element. The precious metal may be selected from the group consisting of gold, silver, platinum and alloys thereof. The composite backup element comprises a first base metal portion integral with a second base metal portion in which an end face of the integrated base metal portions is intimately bonded to the precious metal contact element via one of the base metals which is pressure-bondable thereto; the other base metal being spot weldable via the free end of said backup element to a metallic surface. The pressure bondable base metal may be selected from the group consisting of silver, copper and aluminum. The spot weldable base metal may be selected from the group consisting of nickel, cupronickel, monel metal, phosphor bronze, nickel silver, beryllium-copper alloy and stainless steel.

We claim:

1. A button-type composite contact comprising,
a contact surface element of precious metal bonded to a composite base metal backup element,
said composite backup element being formed of a first base metal portion integral with a second base metal portion,
an end face of said integral first and second base metal portions being intimately pressure bonded to said precious metal contact element via one of said base metals which is pressure bondable to said precious metal,
the other of said base metals being spot weldable at the free end of said composite backup element, such that the button-type contact can be spot welded via the free end thereof to a metallic element.

2. The button-type composite contact of claim 1, wherein the composite backup element consists essentially of a core of said first base metal having an outer wall of said second base metal integral therewith, the precious metal contact element being pressure bonded to an end face of the composite backup element.

3. The button-type composite contact of claim 2, wherein the precious metal is selected from the group consisting of gold, silver, platinum and alloys thereof, wherein one of said base metals is selected from the group consisting of silver, copper and aluminum and is pressure bondable relative to said precious metal, and wherein the other of said base metals is selected from the group consisting of nickel, cupronickel, monel metal, phosphor bronze, nickel silver, beryllium-copper alloy and stainless steel characterized by being spot weldable to a metallic surface.

4. The button-type composite contact element of claim 3, wherein the base metal forming the core of the composite backup element is pressure bondable to said precious metal contact element, and wherein the base metal forming the outer wall of said composite backup element is spot weldable.

5. The button-type composite contact element of claim 4, wherein the base metal forming the core of said composite backup element is spot weldable, and wherein the base metal forming the outer wall of said composite backup element is pressure bondable to said precious metal contact element.